(12) United States Patent
Erlendson

(10) Patent No.: US 11,452,283 B2
(45) Date of Patent: Sep. 27, 2022

(54) SHARK REPELLENT SYSTEM

(71) Applicant: SPORTFISH-SHARK DETERRENT TECHNOLOGIES, LLC, Rancho Mirage, CA (US)

(72) Inventor: Lee Erlendson, Rancho Mirage, CA (US)

(73) Assignee: SPORTFISH SHARK DETERRENT TECHNOLOGIES, LLC, Rancho Mirage, CA (US)

( * ) Notice: Subject to any disclaimer, the term of this patent is extended or adjusted under 35 U.S.C. 154(b) by 128 days.

(21) Appl. No.: 17/124,156

(22) Filed: Dec. 16, 2020

(65) Prior Publication Data

US 2021/0100231 A1 Apr. 8, 2021

Related U.S. Application Data

(63) Continuation of application No. 16/109,358, filed on Aug. 22, 2018, now Pat. No. 10,897,882.

(60) Provisional application No. 62/548,931, filed on Aug. 22, 2017.

(51) Int. Cl.
| | |
|---|---|
| *A01K 79/02* | (2006.01) |
| *B63C 9/05* | (2006.01) |
| *A01M 29/24* | (2011.01) |
| *B63C 9/00* | (2006.01) |
| *A01K 65/00* | (2006.01) |
| *B63B 34/00* | (2020.01) |
| *A01K 99/00* | (2006.01) |

(52) U.S. Cl.
CPC ............. *A01K 79/02* (2013.01); *A01K 65/00* (2013.01); *A01K 99/00* (2013.01); *A01M 29/24* (2013.01); *B63B 34/05* (2020.02); *B63C 9/05* (2013.01); *B63C 2009/0088* (2013.01)

(58) Field of Classification Search
CPC ....... A01K 79/02; B25J 15/06; B25J 15/0608; B66C 1/04; B66F 9/182; A01M 29/24
See application file for complete search history.

(56) References Cited

U.S. PATENT DOCUMENTS

| | | | | | |
|---|---|---|---|---|---|
| 3,384,408 | A | * | 5/1968 | Furzey | H01F 7/0257 D8/14 |
| 4,633,563 | A | * | 1/1987 | Rykaczewski | B67B 7/30 29/270 |
| 6,978,730 | B1 | * | 12/2005 | McCarthy | B63B 21/54 114/221 R |
| 7,378,928 | B2 | * | 5/2008 | Chang | H01F 7/0257 294/65.5 |

(Continued)

*Primary Examiner* — Darren W Ark
*Assistant Examiner* — William L Gmoser
(74) *Attorney, Agent, or Firm* — Marc Shropshire

(57) ABSTRACT

A system for repelling sharks is disclosed. Magnets are connected to a rod along its length. If necessary, the rod may be extended. Additionally, one or more flotation devices may be connected to the rod to manipulate or adjust the buoyancy of the system, depending on the user's objective(s). The rod is connected to a fishing line once a fish is hooked and is in close proximity to the boat or other structure from which the fisherman is fishing. The weight of the rod and magnets cause the rod to slide down to the end of the fishing line, where the rod will come in contact with the hooked mouth of the fish. As the fish struggles during the fight, the rod creates a protective magnetic field around the fish to deter sharks from engaging the fish.

14 Claims, 3 Drawing Sheets

(56) References Cited

U.S. PATENT DOCUMENTS

2003/0074831 A1\* 4/2003 Schneider .............. A01K 79/02
                                                                               43/44.99
2017/0165846 A1\* 6/2017 Bell ...................... H01F 7/0257

\* cited by examiner

“SHARK REPELLENT SYSTEM

CROSS-REFERENCE TO RELATED APPLICATION(S)

This application is a continuation of U.S. Nonprovisional patent application Ser. No. 16/109,358 filed Aug. 22, 2018, entitled "METHOD OF USING A SHARK REPELLENT SYSTEM", which claims benefit of U.S. Provisional Utility Patent Application No. 62/548,931 filed on Aug. 22, 2017, entitled "SHARK REPELLENT ROD", the entire disclosures of which are incorporated by reference herein.

BACKGROUND OF THE INVENTION

Field of Invention

The present invention relates to shark repellent systems for protecting live catches from shark attacks during the catch process.

Description of Related Art

Prior art consists of devices and methods for repelling sharks. Prior art devices are designed to prevent inadvertent trapping and/or catching of sharks, as well as protecting humans from shark attacks. For example, Stroud (US2007/0256623A1 and U.S. Pat. No. 9,084,415) discloses a number of devices and methods for repelling elasmobranchs, i.e., sharks, with electropositive metals, including apparatuses and methods for reducing by-catch in commercial fisheries and protecting humans from attacks by elasmobranchs.

Similarly, Westcombe-Down (US2005/0000465A1) discloses a device (10) for repelling selected aquatic creatures, such as sharks. The device consists of an electromagnetic field generator (21, 30) for generating an electromagnetic field (50) that repels sharks and is supported by a buoyant device (20). This provides a shark-free region about the device (10). Multiple devices can be connected together to form an array of repelling devices, thereby extending the shark-free region.

Saltwater sharks have evolved over the past 260 million years with very sensitive electromagnetic sensors on their nose called the "Canals of Lorenzini." The Canals are gel filled electromagnetic sensors that inform the shark about its environment and prey.

Sport fishermen spend thousands of dollars to go on multi-day, long-range fishing trips in search of trophy fish such as tuna. Commonly, tuna or other gamefish, after they have been hooked and are being reeled in, are attacked by a shark. This results from a weakening of the hooked fish at the end of a fight, allowing sharks to move in and attack, destroying the fisherman's catch.

The saltwater sport-fishing industry involves over 9 million saltwater fishermen annually who spend over 100 million fishing days annually. Annual sales exceed $13.5 billion dollars. Based on the foregoing, there is a need in the art for a device that prevents shark attacks on gamefish during a catch. Having a device to protect sport-caught trophy fish from sharks would have significant impact into the sport-fishing industry and anglers.

SUMMARY OF THE INVENTION

A shark repellent system includes a rod, a plurality of magnets connected to the rod, a clip connected to an end of the rod, and a safety line including a first end releasably connectable with the clip and a second end releasably connectable to an anchor point. In an embodiment, the rod also includes one or more flotation devices engaged to an exterior surface of the rod. In an embodiment, the flotation device(s) are removably connected to the rod. Alternatively, the flotation devices are permanently affixed to the rod during the manufacturing process. In a further or alternative embodiment, the exterior of the flotation device(s) is non-shiny.

In an embodiment, a length of the rod is adjustable.

In an embodiment, the magnets are removably connected to the rod. Alternatively, the magnets are permanently affixed to the rod during the manufacturing process.

In an embodiment, the magnets are toroidal neodymium rare earth magnets.

In an embodiment, the size of each of the magnets is equal. Alternatively, the size of at least two of the magnets is different.

In an embodiment, the rod is constructed of a ferromagnetic material. Alternatively, the rod is constructed of a non-ferromagnetic material.

In an embodiment, an exterior of the rod and the magnets are coated. In an embodiment, the coating material used to coat the rod and the magnets is non-corrosive. In an embodiment, the coating material is corrosion-resistant.

In an embodiment, the exterior surfaces of the rod and each of the magnets are non-shiny.

A method of using the shark repellent system includes: attaching the clip to a fishing line; attaching the first end of the safety line to the clip; and releasing the rod and allowing the clip to slide along the fishing line, wherein the rod is positioned alongside a hooked fish as the clip approaches the end of the fishing line. Optionally, prior to releasing the rod, the method also includes adjusting a length of the rod. If the fishing line breaks or the fish becomes disengaged from the fishing line, the method includes retrieving the rod using the safety line. On the other hand, if the fish is successfully caught/retrieved, the method includes disengaging the system from the fishing line prior to putting the fishing line back into the water.

The foregoing and other features and advantages of the invention will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
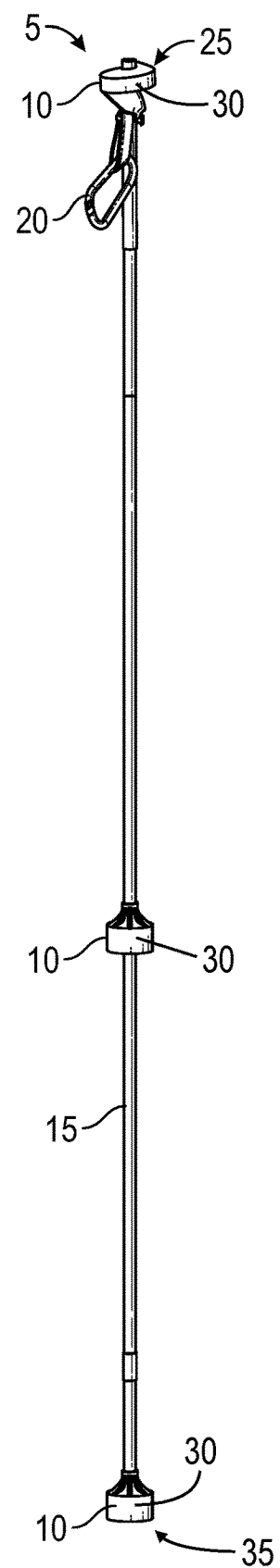
FIG. 1 shows a shark repellent system, according to an embodiment of the present invention.
Figure 2:
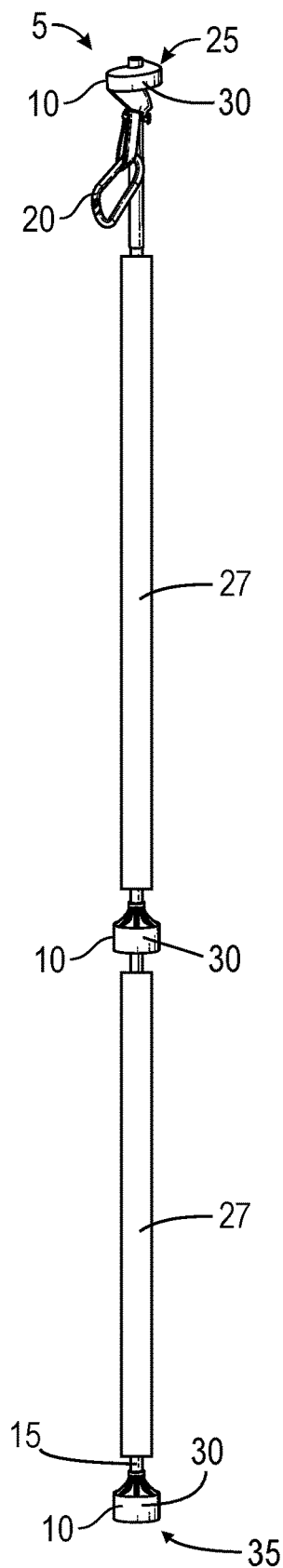
FIG. 2 shows the shark repellent system, according to an embodiment of the present invention.
Figure 3:
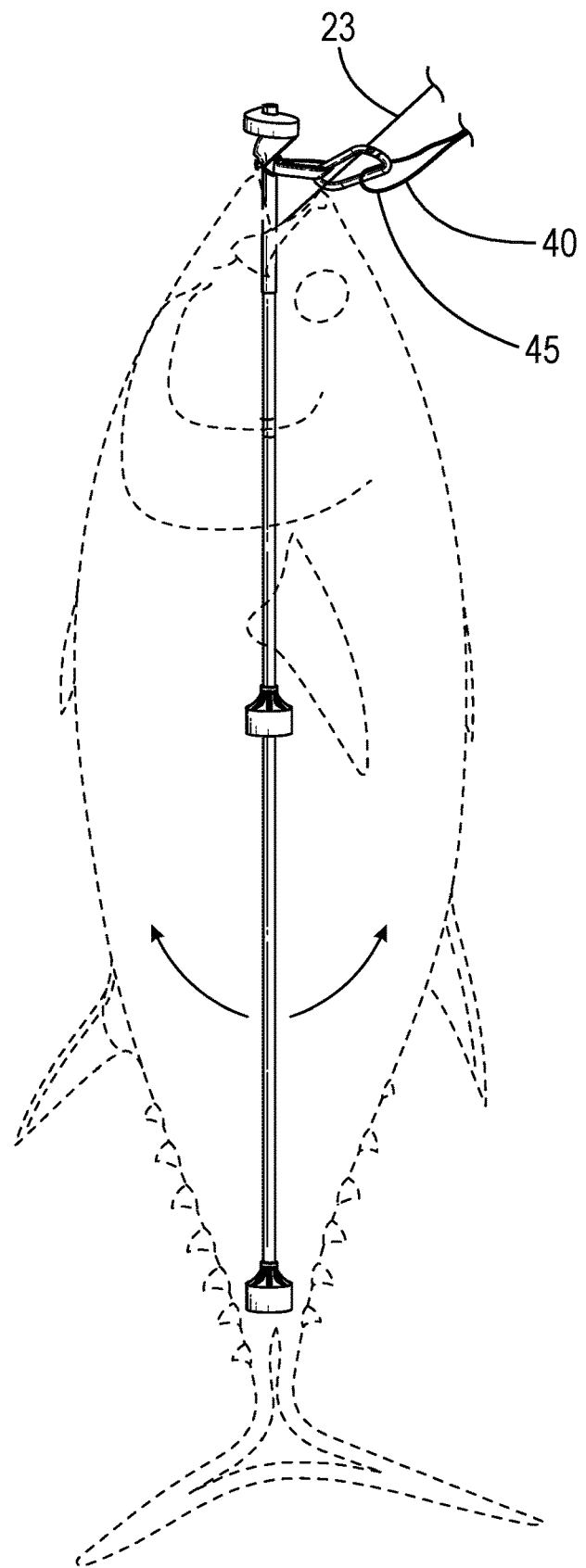
FIG. 3 shows the shark repellent system in communication with a live catch, according to an embodiment of the present invention.

Preferred embodiments of the present invention and their advantages may be understood by referring to FIGS. 1-3 wherein like reference numerals refer to like elements.

FIG. 1 shows the preferred embodiment for a shark repellent system 5. A plurality of magnets 10 are connected to a rod 15 along its length. A clip 20 is connected to a first end 25 of the rod 15. Preferably, the clip 20 is a quick-release clip, such as a carabiner.

The rod 15 is preferably constructed of stainless steel. The use of stainless steel provides structural integrity and corrosion-resistance. Although not necessary, corrosion-resistance of the rod 15 and other system components is preferable and advantageous to the longevity of the system 5 due to its use in marine environments. In addition to the foregoing, the use of stainless steel in the construction of the rod 15 allows the magnets 10 to readily connect to the rod 15 at any point along its length. While stainless steel is the preferred metal for constructing the rod 15, due to its inherent corrosion-resistance, the rod 15 could be constructed of any ferromagnetic metal, allowing the magnets 10 to easily and removably connect to the rod 15 via magnetism at any point along its length.

Depending on the desired application, the rod 15 could be constructed of a non-ferromagnetic material, e.g., fiberglass or a polymer, having any of a number of desirable qualities, such as being lightweight, non-corrosive, pliable, and/or resilient. The magnets 10 could connect to a rod 15 constructed of a non-ferromagnetic material using any of a number of connection means including, but not limited to, mated threading on the interior of the magnets 10 and the exterior of the rod 15, permanent affixation using an adhesive, welding, or other adhesion technique, tethering the magnet(s) 10 to the rod 15 using one or more hook and loop mechanisms, and/or ferromagnetic metal inserts within the rod 15 and/or on an exterior surface of the rod 15 along the length of the rod 15.

In an embodiment, the exterior surface of the rod 15 is a dull, non-shiny surface. For example, the exterior surface of the rod 15 could have a flat black finish. A dull, non-shiny surface is advantageous to the present invention as it aids in preventing unwanted attraction of predator sharks that may mistake a shiny object for prey.

In the preferred embodiment, there are at least three magnets 10 connected to the rod 15, each of which are toroidal neodymium rare earth magnets. However, depending on the application fewer magnets may be used. Further, one skilled in the art would understand and appreciate that other types and/or shapes of magnets with similar qualities could be used to accomplish the desired result, i.e., repulsion of sharks and protection of a fisherman's catch while on the fishing line 23.

In an embodiment as shown in FIG. 2, one or more flotation devices 27 are disposed along the length of the rod 15 between the magnets 10. The flotation device 27 allows a user to manipulate or adjust the buoyancy of the system. For example, the flotation device 27 can be used to create a neutral buoyancy for the system 5 while in the water, thus preventing the system 5 from sinking below the body of the fish once the fish has been caught. Similarly, the flotation device 27 can be used to create a positive or negative buoyancy for the system 5, depending on what it is the user desires to achieve. In an embodiment, the flotation device 27 is constructed of chlorosulfonated polyethylene or another synthetic rubber. In an alternative embodiment, the flotation device 27 is constructed of a spongy material. The flotation device 27 may be colored, depending on the desired application. For example, in an embodiment, the flotation device 27 has a dull, non-shiny surface similar to that of the rod 15 to aid in preventing unwanted attraction of predator sharks that may mistake a shiny object for prey. Additionally, the flotation device may be constructed in various forms including, but not limited to, sheets, pellets, and/or strips.

In an embodiment, each flotation device 27 is removably engaged to the rod 15, e.g., by circumferential engagement to the rod 15. In this manner, the flotation devices 27 can be added to, or removed from, the rod 15 to achieve optimal weight and buoyancy to match the behavior and orientation of the fish, i.e., the device can be adjusted to float, or maintain a pre-determined depth, optimally along the side of the fish.

In an alternative embodiment, one or more flotation devices 27 are irremovably affixed to the exterior of the rod 15 during the manufacturing process. Additional flotation devices 27 can be removably added to the rod 15 (to be used in conjunction with the irremovable flotation device 27) to achieve optimal weight and buoyancy to match the behavior and orientation of the fish.

In the preferred embodiment, the magnet 10 at the first end 25 is larger and of greater magnetic strength than the remaining magnets 10. Alternatively, all of the magnets 10 could be the same size and strength. Alternatively, the magnets 10 can be arranged such that any one or more of the magnets 10 have unequal size and strength relative to the remaining magnets 10.

In an embodiment, the magnets 10 are irremovably engaged with the rod 15. Alternatively, the magnets 10 are removably engaged with the rod 15, providing interchangeability of the magnets 10. Thus, a user can replace one or more magnets for stronger or weaker magnet(s), depending on the types and sizes of sharks that are expected to be in the area. Similarly, in the event that the rod 15 is damaged, e.g., bent, corroded, and/or broken, a user could easily remove the magnets 10 from the damaged rod 15, and replace them on a different rod 15. Further, a user can add or subtract one or more magnets 10 from the rod 15 as desired depending on the fishing conditions, e.g., size of the catch and types of sharks desired to be repelled.

Additionally, or alternatively, the rod 15 and the magnets 10 are coated with a non-corrosive or corrosion-resistant material 30. In an embodiment in which the magnets 10 are irremovably engaged with the rod 15, the rod 15 and magnets 10 are fully and jointly coated in the material 30 to prevent infiltration of water into crevices between the rod 15 and magnets 10. In an embodiment in which the magnets 10 are removably engaged with the rod 15, the rod 15 and magnets 10 are each separately coated with the material 30, allowing the magnets 10 to be disengaged from the rod 15. Thus, corrosion of the rod 15 and/or the magnets 10 is prevented even if water infiltrates to areas between the rod 15 and magnets 10. In the preferred embodiment, the material 30 will be a non-abrasive, lower durometer material, such as rubber or silicone. This will mitigate damage, e.g., scratching or denting, to the side of the boat during the process of retrieving the catch from the water.

In an embodiment, the rod 15 is extendable. Extension of the rod 15 can be accomplished by removably connecting rod extenders to the second end 35 of the rod 15. The connection can be achieved by any connection means known the art, e.g., mated threading, snap-fit, etc. Alternatively, the rod 15 could be extended using a telescoping extension mechanism integrated within the rod 15. Extension of the rod 15 will be useful in instances in which the actual catch is of a different size than the intended catch. For example, if the intended catch is a 4-foot fish, but a 6-foot fish is on the fishing line 23, the rod 15 could easily and quickly be extended from 4 feet to 6 feet prior to attaching the rod 15 to the fishing line 23 and sending it into the water to protect the catch. Further, in an embodiment in which the magnets 10 are removably engaged with the rod 15, the number of magnets 10 could be increased, decreased, or re-arranged to accommodate the alteration of the rod's length, prior to attaching the rod 15 to the fishing line 23 and sending it into the water to protect the catch.

In an embodiment, as shown in FIG. 3, a safety line 40 is used to prevent loss of the system 5 in the event the fishing line 23 breaks or the catch becomes disengaged from the hook during the catch process. A loop 45 at a first of the safety line 40 is attached to the clip 20. The opposite end of the safety line 40 is secured to an anchor point, e.g., the boat or other structure from which the fisherman is fishing. Thus, if the catch becomes disengaged from the hook or the fishing line 23 breaks due to, e.g., the fight of the catch or the catch being attacked by a predator, the system 5 can be retrieved.

A method of using the present invention begins with attaching the system 5 to the fishing line 23 during the fight using the clip 20. Additionally, the loop 45 of the safety line 40 may be attached to the clip 20 once the opposite end of the safety line 40 is secured to an anchor point. Optionally, if necessary, the length of the rod 15 is adjusted to accommodate the size of the catch. Once released into the water, the weight of the system 5 causes it to slide down to the end of the fishing line 23, where the first end 25 of the rod 15 contacts the hooked mouth of the fish. As the fish struggles during the fight, the rod 15 remains alongside the fish, creating a protective magnetic field around the fish that will deter sharks from engaging the fish. Once the fish is pulled from the water, the rod 15 is disconnected from the fishing line 23. The magnetic field in no way permanently harms the shark or the fish. It simply serves as a deterrent.

The invention has been described herein using specific embodiments for the purposes of illustration only. It will be readily apparent to one of ordinary skill in the art, however, that the principles of the invention can be embodied in other ways. Likewise, it will be readily apparent that the features of the present invention disclosed herein can be used in any combination to produce various embodiments of the present invention. Therefore, the invention should not be regarded as being limited in scope to the specific embodiments disclosed herein.

I claim:

1. A shark repellent system comprising:
   a rod;
   a plurality of magnets connected to the rod;
   a clip connected to an end of the rod;
   a safety line including a first end releasably connectable with the clip and a second end releasably connectable to an anchor point;
   one or more flotation devices on an exterior of the rod;
   wherein the one or more flotation devices are removably engaged to an exterior surface of the rod; and
   wherein a first floatation device of the one or more flotation devices is located between a first magnet of the plurality of magnets, and a second magnet of the plurality of magnets.

2. The shark repellent system of claim 1, wherein a finish of an exterior surface of the one or more flotation devices is dull.

3. The shark repellent system of claim 1, wherein a length of the rod is adjustable.

4. The shark repellent system of claim 1, wherein the magnets are irremovably connected to the rod.

5. The shark repellent system of claim 1, wherein the magnets are removably connected to the rod.

6. The shark repellent system of claim 1, wherein the magnets are toroidal neodymium rare earth magnets.

7. The shark repellent system of claim 6, wherein a size of each of the magnets is equal.

8. The shark repellent system of claim 6, wherein a size of at least two of the magnets is different.

9. The shark repellent system of claim 1, wherein the rod is constructed of a ferromagnetic material.

10. The shark repellent system of claim 1, wherein the rod is constructed of a non-ferromagnetic material.

11. The shark repellent system of claim 1, wherein an exterior of the rod and the magnets are coated.

12. The shark repellent system of claim 11, wherein a coating material used to coat the rod and the magnets is non-corrosive.

13. The shark repellent system of claim 11, wherein a coating material used to coat the rod and the magnets is corrosion-resistant.

14. The shark repellent system of claim 1, wherein a finish of exterior surfaces of the rod and each of the magnets are dull.

* * * * *